(12) United States Patent
Kelly

(10) Patent No.: US 11,614,991 B2
(45) Date of Patent: Mar. 28, 2023

(54) RECOMMENDATION ENGINE FOR APPLICATION PROGRAMMING INTERFACE (API) IN A MULTI-CLOUD ENVIRONMENT

(71) Applicant: DELL PRODUCTS L.P., Round Rock, TX (US)

(72) Inventor: John Kelly, Mallow (IE)

(73) Assignee: DELL PRODUCTS L.P., Round Rock, TX (US)

( * ) Notice: Subject to any disclaimer, the term of this patent is extended or adjusted under 35 U.S.C. 154(b) by 334 days.

(21) Appl. No.: 16/924,992

(22) Filed: Jul. 9, 2020

(65) Prior Publication Data

US 2022/0012118 A1     Jan. 13, 2022

(51) Int. Cl.
| | |
|---|---|
| *G06F 9/54* | (2006.01) |
| *G06F 11/07* | (2006.01) |
| *G06F 16/9538* | (2019.01) |
| *G06F 9/50* | (2006.01) |
| *G06F 16/9535* | (2019.01) |

(52) U.S. Cl.
CPC ........ *G06F 11/0793* (2013.01); *G06F 9/5072* (2013.01); *G06F 9/542* (2013.01); *G06F 9/546* (2013.01); *G06F 11/0772* (2013.01); *G06F 16/9535* (2019.01); *G06F 16/9538* (2019.01)

(58) Field of Classification Search
CPC ................................ G06F 9/541; G06F 9/546
USPC .................................................. 719/313, 328
See application file for complete search history.

(56) References Cited

U.S. PATENT DOCUMENTS 6,526,529 B1 * 2/2003 Miksovsky ........... G06F 11/327
                                                          714/E11.187
9,015,532 B2 * 4/2015 Hong .................. G06F 11/3684
                                                          714/28

* cited by examiner

*Primary Examiner* — Andy Ho
(74) *Attorney, Agent, or Firm* — North Weber & Baugh LLP

(57) ABSTRACT

The multiplicity of APIs that existing in a multi-cloud environment creates significant complexity for users. It can be unclear which API call should be made for a specific layer. Also, given the different API calls used by different cloud providers, they can be easily confused. Accordingly, embodiments help to reduce this complexity and simplify multi-cloud environments from a developer/user perspective. In one or more embodiments, an API with an error and its error message are captured and used as context-based information to suggest one or more recommendations to a user about how their API call should be made (e.g., to another API, to an alternative cloud provider, or by changing syntax).

20 Claims, 6 Drawing Sheets

RECOMMENDATION ENGINE FOR APPLICATION PROGRAMMING INTERFACE (API) IN A MULTI-CLOUD ENVIRONMENT

BACKGROUND

The present disclosure relates generally to information handling systems. More particularly, the present disclosure relates to application programming interface (API) recommendation in a multi-cloud environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conjunction with the increased use of information handling system, there has been an increase in cloud computing. Cloud computing allows users to utilized remote computing resources that may be owned by the entity or owned by a third-party cloud services provider. Currently, there are a number of cloud services provider.

As the cloud computing model has become more common, multi-cloud environments are increasingly becoming more pervasive as organizations seek to utilize the varying cost, security, and functionality profiles of different cloud models and locations. In multi-cloud environments, customers operate multiple cloud environments simultaneously, with these cloud environments being either off-premise or on-premise clouds. Because different cloud environments may be built upon different base technologies, there are often differences in the operations. These differences add to the complexity of operating them.

One of the mechanisms used to deal with this increased complexity is Application Programming Interfaces (APIs) since the usage of APIs allows developers to regard much of the underlying complexity as existing in a "black box." However, the multiplicity of APIs existing in a multi-cloud environment can unfortunately compound the complexity—developers or users may be unclear about which layer a specific API call should be made at, may make API calls that are relevant to a different cloud provider, or both.

Accordingly, it would be extremely beneficial to have ways of recommending API calls.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
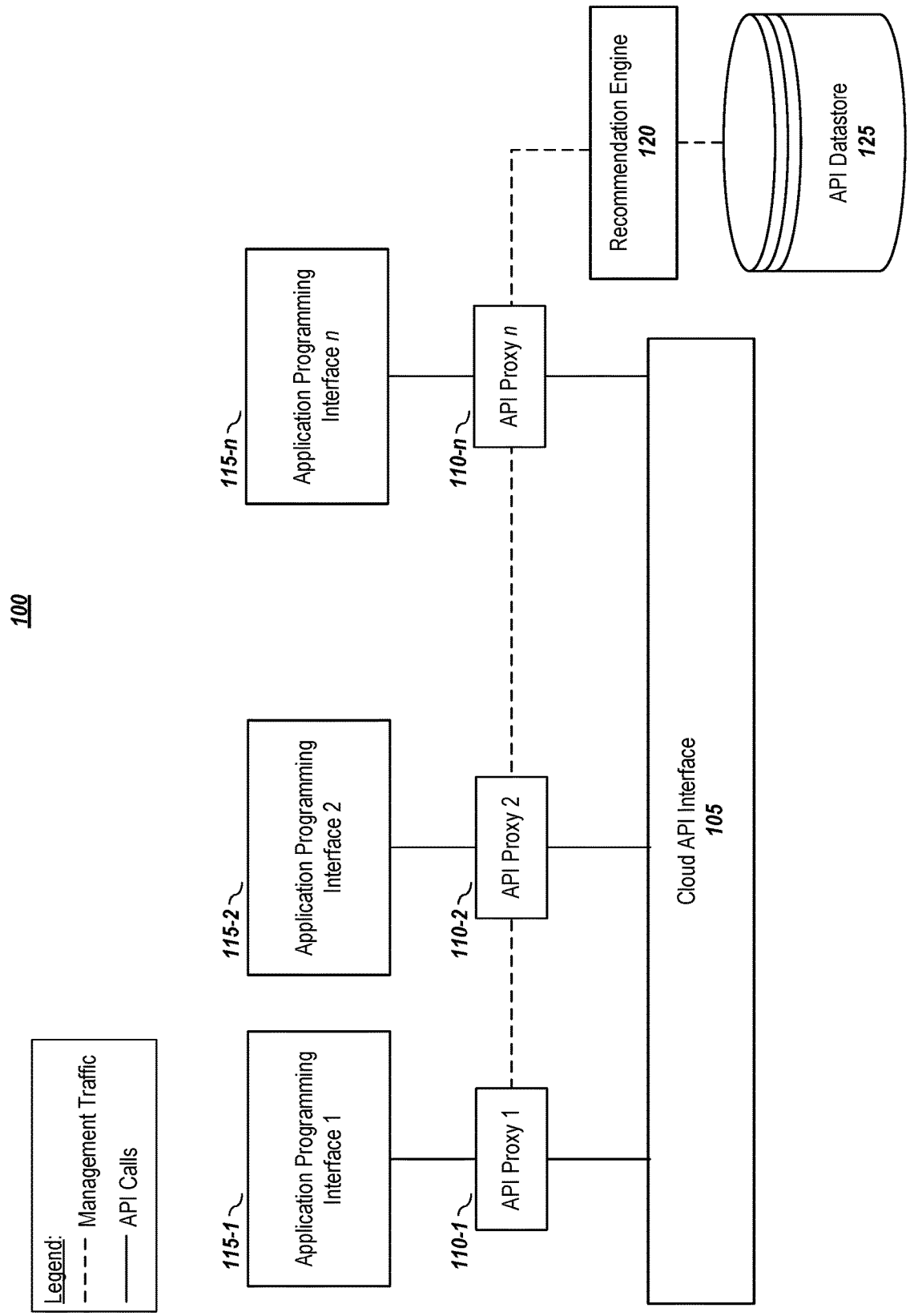
FIG. 1 depicts a system architecture that includes a recommendation engine, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of a multi-cloud environment, aspects of the present disclosure are not so limited. Accordingly, the aspects of the present disclosure may be applied or adapted for use in other contexts.

A. General Introduction

The multiplicity of APIs that existing in a multi-cloud environment creates significant complexity for users. It can be unclear which API call should be made for a specific layer. Also, given the different API calls used by different cloud providers, they can be easily confused. Accordingly, embodiments help to reduce this complexity and simplify multi-cloud environments from a developer perspective by using text analysis approaches on API calls to recommend what API calls should be made at a different layer of the infrastructure or to a different cloud environment.

B. System Architecture Embodiments and Method Embodiments

FIG. 1 depicts a system diagram comprising recommendation engine system, according to embodiments of the present disclosure. FIG. 1 includes a set application programming interfaces 115-*x* that are communicatively connected to a cloud API interface 105 that executes the API call or query. Also depicted is a set of API proxies 110-*x* positioned between the API interfaces 115-*x* and the cloud API interface 105—positioned such that they are in the return path for communications, which will be explained in more detail below. The depicted embodiment 100 also includes a recommendation engine 120 communicatively coupled to the API proxies 110-*x*.

As illustrated, the recommendation engine 120 comprises or is communicatively coupled to one or more datastores 125. In one or more embodiments, the API database (or datastore) 125 comprise text of APIs, representations of APIs, or both, for each API and cloud environment. For example, in one or more embodiments, the database 125 may include embeddings that represent the APIs, in which an API may be considered a single "word" and represented by a single embedding; alternatively or additionally, an API may be considered as a document and each of its consistent parts (e.g., each field, token, etc.) may be considered as a "word" of that document, in which the API's embedding may be a plurality of embeddings and/or may be a single embedding formed from a combination of the separate "word" embeddings.

Examples of word representations include one-hot vector representations, bag-or-words (BOW) representations (which shall be understood to also cover continuous BOW implementations), and natural language processing (NLP) word embeddings. Examples of NLP word embedding methods include GloVe (Global Vectors for Word Representation GLOVe) and BERT (Bidirectional Encoder Representations from Transformers (BERT). For NLP word embeddings, the word embedding for the APIs are preferably trained on domain-specific corpus, thereby capturing semantic information of the tokens, which makes the embeddings particularly useful for keyword searching, search expansion, semantic search, and information retrieval. Also, use of domain-specific corpus helps mitigate issues of unknown tokens when an embodiment encounters a new word that it has not seen before during prediction/recommendation phase. In one or more embodiments, the corpus may be the sets of API specification documents for the relevant environment.

BOW models are ways of representing a set of text and is commonly used in machine learning methodologies. In a typical BOW model, each unique word of a set of text is counted and the counts form a vector representation of the text. Consider the following example taken from Hamlet by Shakespeare: "To be, or not to be, that is the question" and the quote from Dicken's Tale of Two Cities; "It was the best of times, it was the worst of times".

For the Shakespeare quote, the counts are as follows:
"be"=2
"is"=1
"not"=1
"or"=1
"question"=1
"that"=1
"the"=1
"to"=2

For the Dickens quote, the counts are as follows:
"best"=1
"was"=2
"it"=2
"of"=2
"the"=2

"times"=2
"worst"=1

Grouping "be," "is," and "was" together (for this example), positions in a vector may represent the following words: [best, be/is/was, it, not, of, or, question, that, the, times, to, worst]. Thus, the quote from Hamlet may be represented by [0, 3, 0, 1, 0, 1, 1, 1, 1, 0, 2, 0] and the quote from Tale of Two Cities may be represented by [1, 2, 2, 0, 2, 0, 0, 0, 2, 2, 0, 1]. Note that common words, such as "to" and "the," will have high frequency counts. Thus, the vectors may be normalized. For example, in one or more embodiments, the term or word counts may be normalized by weighting a term by the inverse of document frequency (TD-IDF). For an API, its parts may each be treated as a word for forming a BOW representation. In one or more embodiments, each unique token in each field in an API may be treated like a term and a BOW representation may be generated for the API. These API representations for a cloud or for multiple clouds may be generated and stored, for example, in the API datastore 125.

Given representations of APIs, a similarity measure may be used to gauge similarity of the underlying text. Examples of similarity measures for representations include Euclidean distance, cosine similarity, Manhattan distance, Chebyshev distance, among others. Additionally, or alternatively, a neural model or models may be used to determine similarity. In one or more embodiments, a classification implemented may use an n-gram model to give spatial awareness to the sequence of parameter calls.

Figure 2:
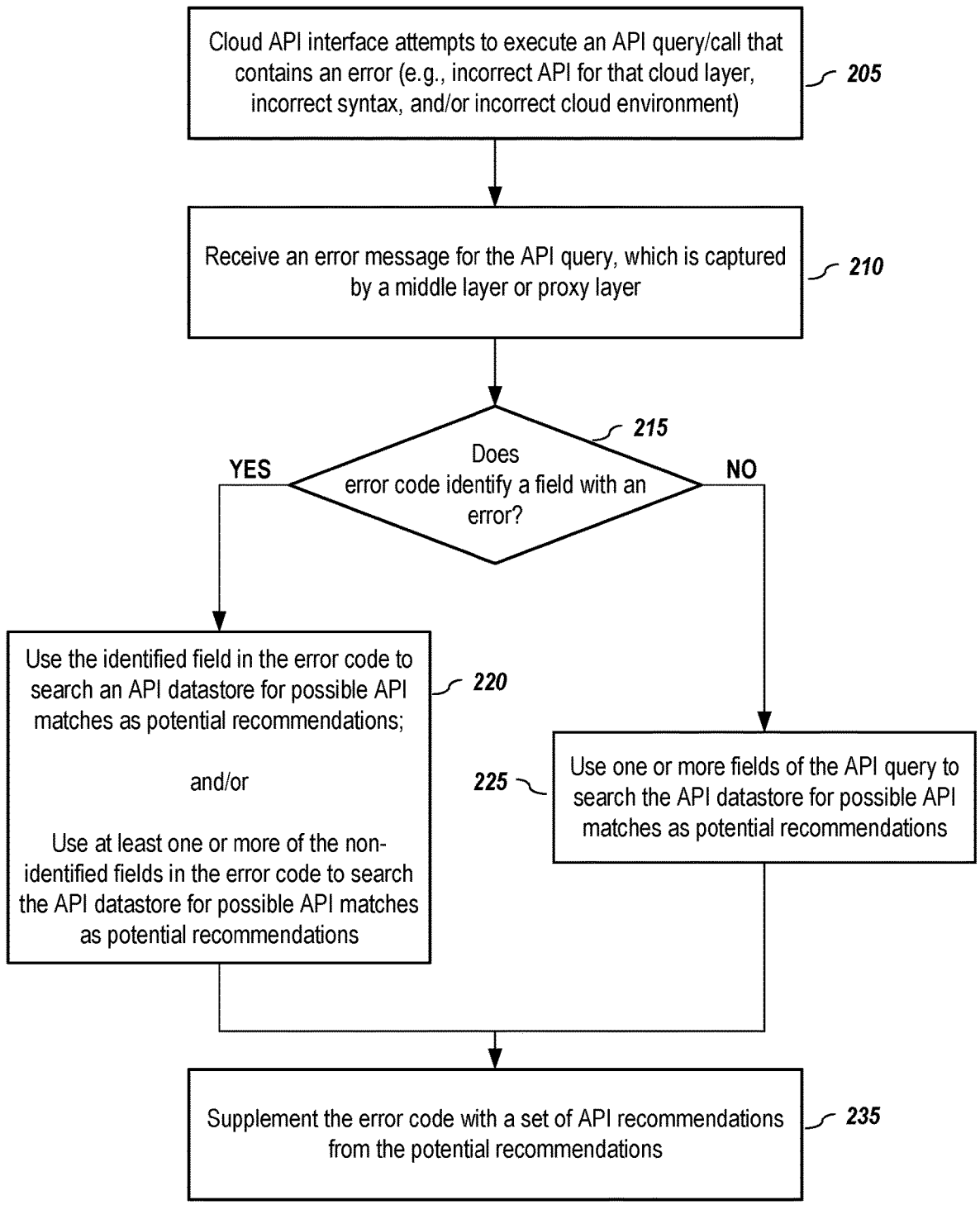
FIG. 2 depicts an example methodology that may be employed by a system with a recommendation engine, according to embodiments of the present disclosure

FIG. 2 depicts an example methodology that may be employed by a system, such as the system 100 depicted in FIG. 1, according to embodiments of the present disclosure. A user makes an error in the API query/call (incorrect API for that cloud layer, incorrect syntax, and/or incorrect cloud environment). In one or more embodiments, this API query is received (205) by a cloud API interface, which attempts to execute the API. However, due to the error, the API query is not able to be processed.

An error message related to the API query may be generated and sent to be returned to the user, but in one or more embodiments, an intercept layer (e.g., a middle layer or proxy layer component) captures (210) the error message before it is sent to the user. In one or more embodiments, the intercept layer passes the error message and API query to a recommendation engine. In one or more embodiments, the recommendation engine uses this information to try to identify one or more possible APIs that the user intended.

In one or more embodiments, responsive to the error code/message for the API query identifying (215) a field within the API query that contains the error, the recommendation engine may perform (220) at least one of the following step: (1) use the identified field in the error message to search an API datastore for possible API matches as potential recommendations; and/or (2) use at least one or more of the non-identified fields in the error message to search the API datastore for possible API matches as potential recommendations. Using the identified field to search for possible recommended APIs is beneficial because it may be correct for the actual API query that the user intended. Using one or more of the non-identified fields to search for possible recommended APIs is beneficial because it is possible that the bulk of the API query is correct and the user has made a typographical error or slightly confused a field in the API query. In one or more embodiments, combining results from both queries can be beneficial because it may be unclear how the error arose.

In one or more embodiments, responsive to the error code/message for the API query not identifying (215) a field within the API query that contains the error, the recommendation engine may use (225) one or more fields of the API query to search the API datastore for possible API matches as potential recommendations.

In one or more embodiments, the step of searching an API datastore for possible API matches as potential recommendations may involve using text matching to match at least a portion of the API query with the error to one or more other API queries, using a representation comparison (e.g., similarity comparison, neural model comparison, support vector machine, regression, or other machine learning techniques) to identify one or more API queries that are the same or similar as the API query with the error, or using both text matching and machine learning comparison(s). For example, a set of training data of similar APIs and/or groups of APIs that are commonly mistakenly interchanged may be used to train a neural network model that receives a representation of at least a portion of an API and outputs recommended APIs.

A representation database may be created that lists, for each API in a specific environment (as well as for other common cloud APIs), the words/tokens that are used in API calls to that environment, as well as the frequency of their usage. In one or more embodiments, comparison may comprise converting at least a portion of the API query into one or more representations and using a similarity comparison to compare one or more of the representations of the API query with representations corresponding to valid APIs stored in the datastore. For example, in one or more embodiments, each field or a set of fields may be formed into a representation to allow for partial similarity matching. Additionally, or alternatively, each API query may be converted into a single representation.

Regardless of the implementation—text matching or representations, one or more similarity measures may be used to find potential API matches. In one or more embodiments, API queries that exceed a similarity match may be selected for inclusion in a recommendation set to present to a user. Additionally, or alternatively, the top x results may be selected for inclusion in the recommendation set for presenting to the user. In one or more embodiments, frequency of usage of APIs may be used to help weight recommendations. For example, given two APIs with similar match values with the API query under investigation, the API that is more frequently used may be selected to include in the recommendation set.

Given the set of API query recommendations, the error message may be supplemented (235) with this set of API query recommendations from the potential recommendations. In one or more embodiments, this supplemented error message comprising the set of API recommendations is sent to a user interface to be displayed to a user. In one or more embodiments, additional information related to APIs in the set of API recommendations may be included or linked to help a user select the correct API. For example, a recommendation API may include the full API query, its associated cloud environment, its layer, technical documentation, etc. to help a user select the appropriate API.

Consider, by way of illustration, the following example. Assume a multi-cloud environment where a customer has on-premise workloads based on VMware Cloud Foundation (VCF) and is using VMware Cloud on Amazon Web Services (AWS) for disaster recovery (DR), burst, or for other reasons. Developers working in this environment deal with multiple AP's. For example, they use different APIs: (1) to interact with features available to all VMware services, they will use VMware Cloud Services APIs; (2) to interact with features of VMware Cloud on AWS, they will use the VMware Cloud (VMC) APIs; (3) to interact with features of the deployed SDDC (software-defined data center), they will use vSphere APIs; (4) to interact with features specific to VCF, they will use VCF APIs; and (5) to interact with native AWS features, they will use an API such as the EC2 API. The multiple interaction scenarios described above create the potential for significant confusion in the associated developer community. API calls can easily be directed to the wrong API or using a syntax that is appropriate for another API.

In one or more embodiments, the text used in API calls (e.g., a GET to /orgs/{org}/subscriptions/products) is monitored in conjunction with API error code(s) (e.g., for REST APIs, error codes such as HTTP error code 404). Note that for REST APIs, this text may be part of any of the fields (API end point, Method, Rest Endpoint, Headers, Params, Data (Payload), etc.). If an error code is generated which indicates any status other than "success," the text of the API command passed by the user is parsed by the recommendation engine.

As noted above, in one or more embodiments, the text in the field that causes the error condition is searched for in each of the n representations that are available (i.e., one for each of the other APIs and other clouds of which the API database has stored). If similarity matches are found on any of those representations, these "matches" may be used to create a stack-ranked list of the API layer/cloud for which the command may have been intended. In one or more embodiments, match frequency may be used to determine the position of the recommendation in the stack-ranked set.

In one or more embodiments, the other fields (i.e., not the ones that caused the error) may also be parsed and compared to text and/or representations for the specific/current API that is being accessed. If a match is found, the possibility of a simple error in syntax arises, and the recommendation to simply restructure the syntax used for the API query may be form or may be added to the list for stack-ranking. In one or more embodiments, its position may be determined by how many "hits" are obtained by searching based on the other fields (e.g., if only one hit is found, it is still likely that the call was intended for another API, but if the field which caused the error is the only field that does not match the current API, it is likely that the current API is actually the target API).

Finally, the recommendation list may be passed as part of the error message that is returned to the API user. It shall be noted that this may be implemented by using the well-known API proxy approach with the purpose of passing API traffic between API users and the back-end APIs.

Figure 3:
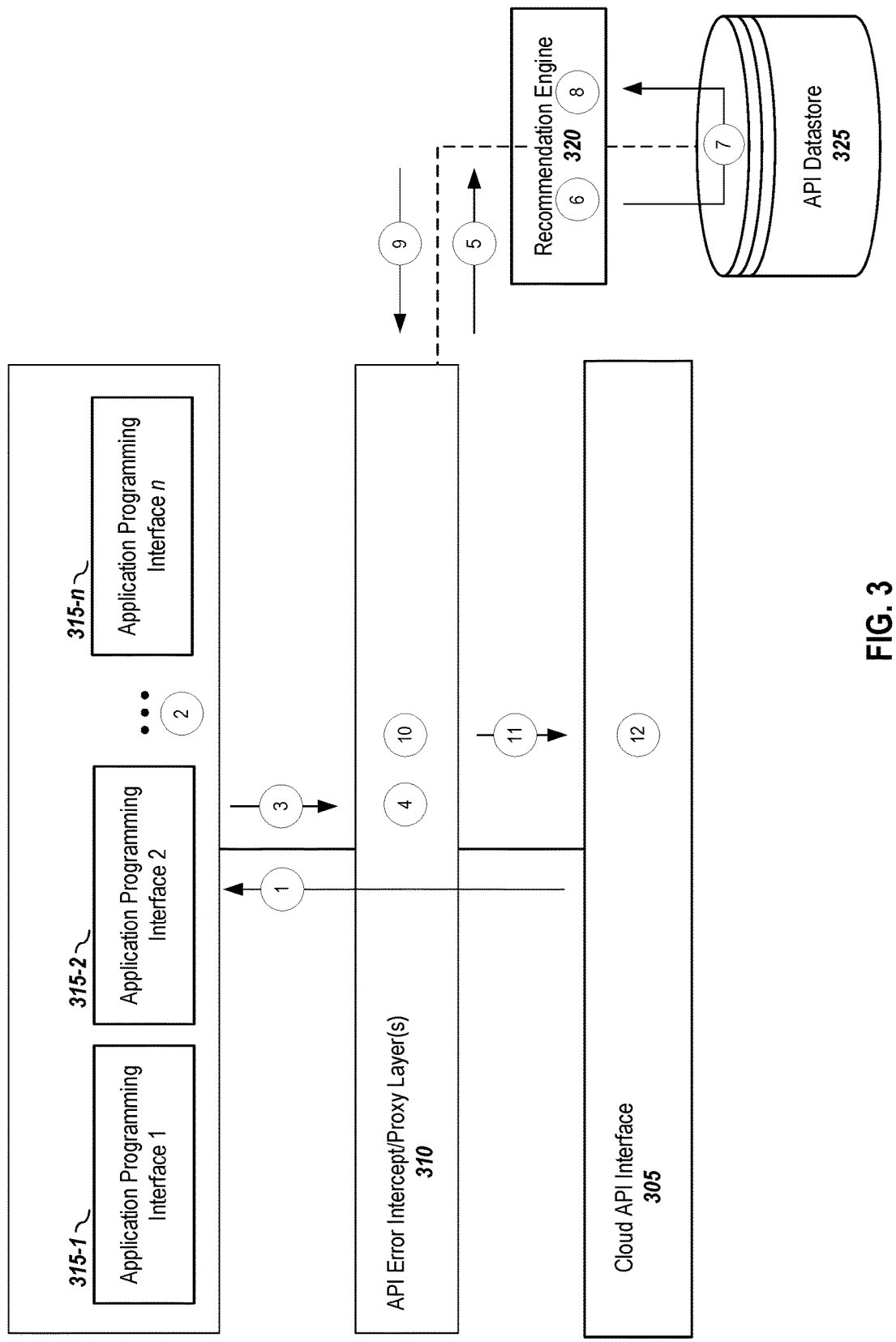
FIG. 3 depicts an alternative system architecture that comprises a recommendation engine system, according to embodiments of the present disclosure.

FIG. 3 depicts an alternative system architecture that comprises a recommendation engine system 325 and datastore 325. As in FIG. 1, the system includes a set application programming interfaces 315-x that are communicatively connected to a cloud API interface 305 that executes the API call or query. Also depicted is an intercept layer component 310. In one or more embodiments, the API database (or datastore) 325 comprise text of APIs, representations of APIs, or both. Also depicted in FIG. 3 is an example data flow, which is explained in more detail in connection with FIG. 4.

Figure 4:
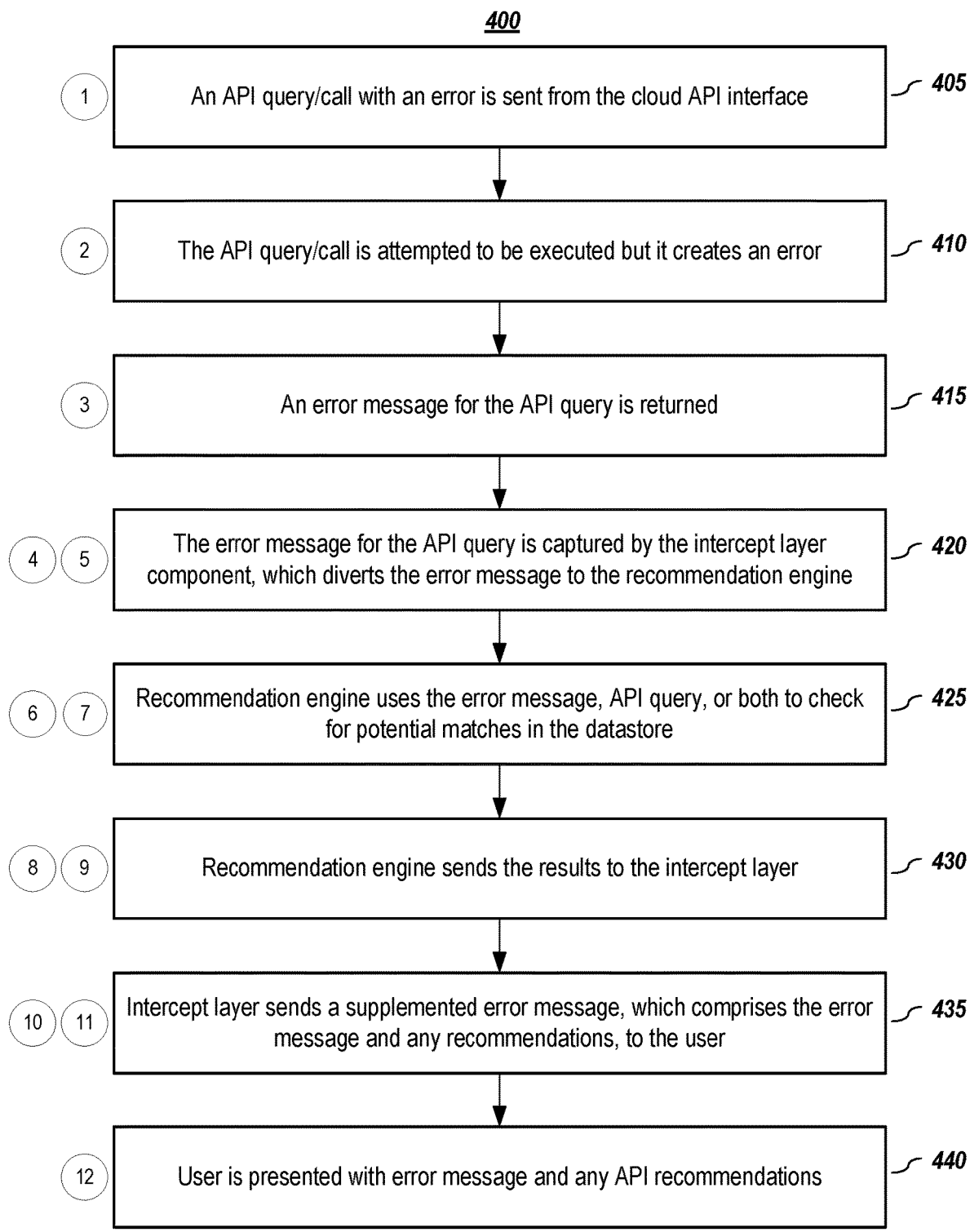
FIG. 4 depicts a method flow that may be implemented by a system that includes a recommendation engine system, according to embodiments of the present disclosure.

FIG. 4 depicts a method flow that may be implemented by a system, such as system 100 or system 300, that includes a recommendation engine, according to embodiments of the present disclosure. In one or more embodiments, an API query/call with an error is sent (405) from the cloud API interface 305 to an API (315-n), which attempts (410) to execute the query/call but creates an error. An error message for the API query is returned (415), which is captured (420) by an intercept layer component 310, which diverts the error message to the recommendation engine 320.

In one or more embodiments, the recommendation engine uses (425) the error message, API query, or both to check for potential matches in the API datastore 325. As noted above, the recommendation engine may use text matchings, embedding/representation matchings, trained models, support vector machine, regression, and/or other machine learning techniques to identify potential recommendations. The recommendation engine uses (430) the results, if any, to supplement the error message and returns the supplemented error message to the intercept layer. Note that if there are no potential matches, the supplemented message may be that there is no recommendation.

In one or more embodiments, the intercept layer component 310 receives (435) the supplemented error message and forwards it to the user. Alternatively, the recommendation engine may return the results and the intercept layer may combine the results with the error message to form the supplemented message. In either embodiment, the user may then be presented (440) with the supplemented message comprising the error message and any API recommendations. The user may use the recommendations as an aid to correct the API call.

C. Additional Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
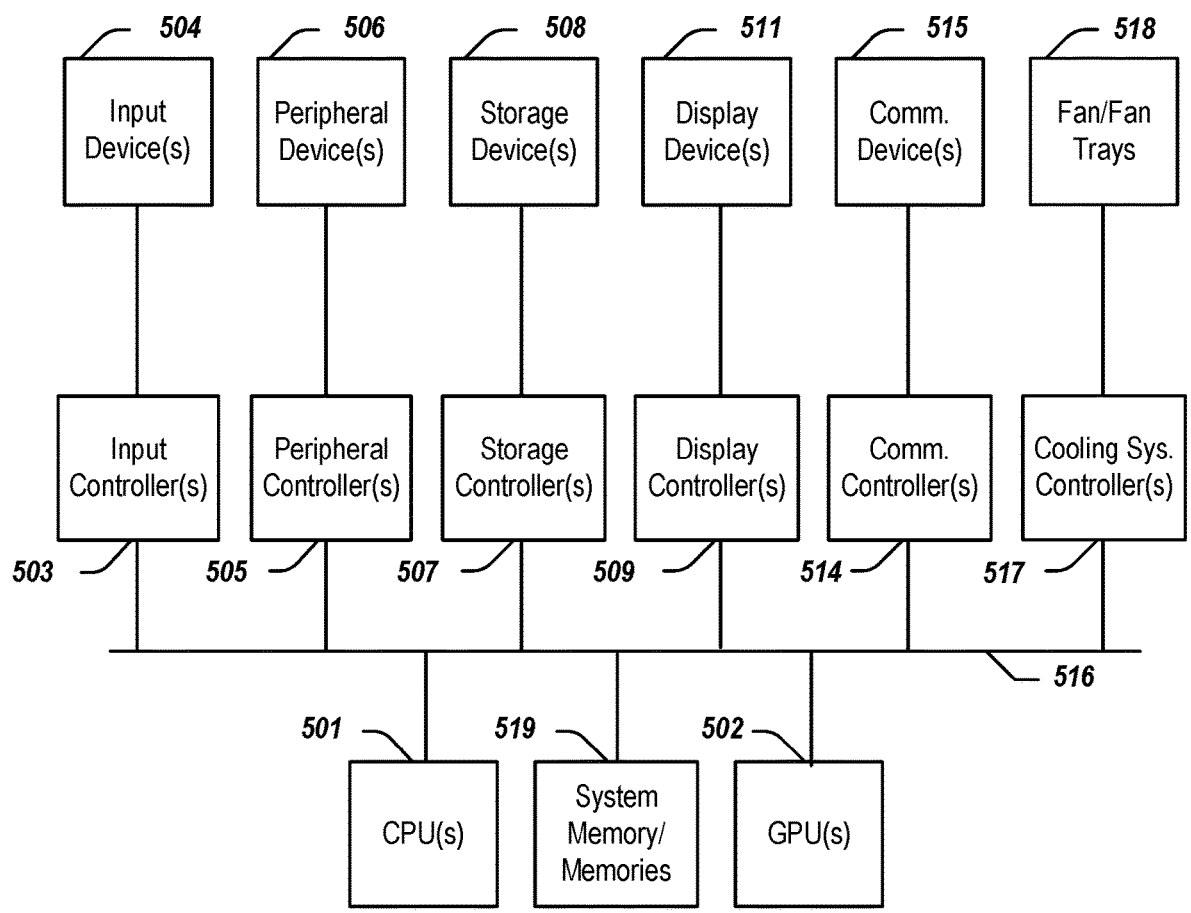
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
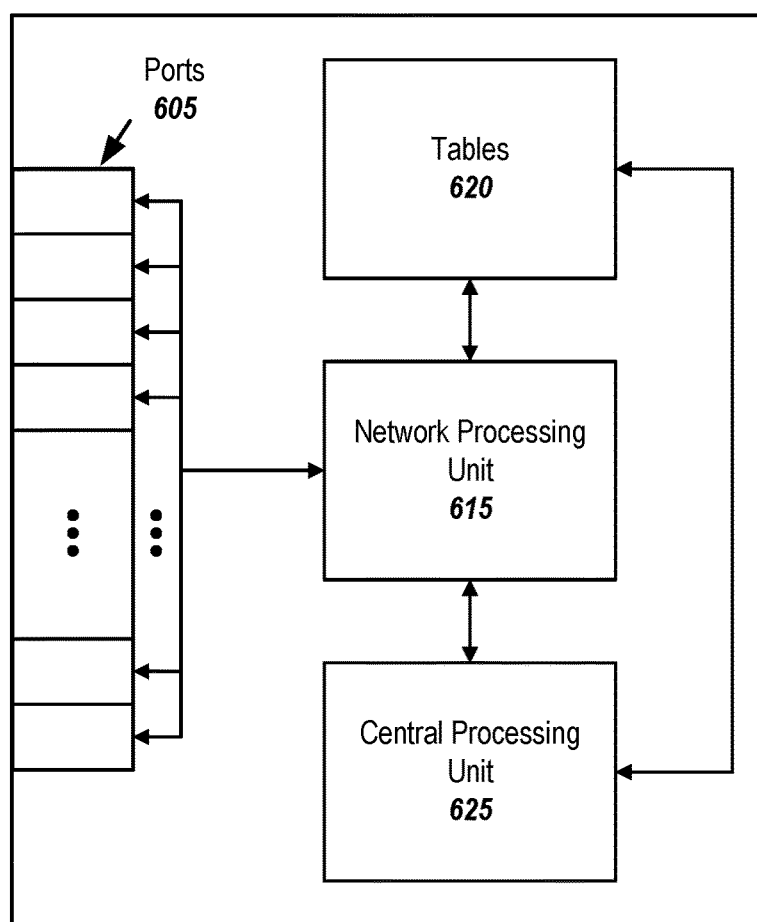
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for recommending an application programming interface (API), the method comprising:
    intercepting an error message related to an API usage that includes an error that results in the error message being generated following an attempt to execute the API usage;
    responsive to the error message for the API usage identifying a field within the API usage that contains the error, performing at least one of:
        using the identified field in the error message to search an API datastore for possible API matches as potential recommendations; and
        using at least one or more non-identified fields in the error message to search the API datastore for possible API matches as potential recommendations;
    responsive to the error message for the API usage not identifying a field within the API usage that contains the error, using one or more fields of the API usage to search the API datastore for possible API matches as potential recommendations;
    supplementing the error message with a set of API recommendations from the potential recommendations; and
    sending the supplemented error message comprising the set of API recommendations for displaying to a user.

2. The computer-implemented method of claim 1 wherein the set of API recommendations comprises an indicator that there are no API recommendations.

3. The computer-implemented method of claim 1 wherein the step of searching an API datastore for possible API matches as potential recommendations comprising:
    using text matching to match at least a portion of the API usage with the error to one or more other API usages or APIs;
    using a representation of at least a portion of the API usage and one or more similarity methods to identify one or more API usages or APIs that are the same or similar as the API usage with the error; or
    both.

4. The computer-implemented method of claim 3 wherein the step using a representation of at least a portion of the API usage and one or more similarity methods to identify one or more API usages or APIs that are the same or similar as the API usage with the error comprises:
    converting at least a portion of the API usage into one or more representations; and
    using a similarity comparison to compare one or more of the representations of the API usage with representations corresponding to valid APIs stored in the datastore.

5. The computer-implemented method of claim 1 wherein the set of API recommendations comprises the possible API matches that exceed a threshold level of similarity, that are a top set of matches, or both.

6. The computer-implemented method of claim 1 wherein the step of intercepting an error message related to the API usage that includes an error that results in the error message being generated following an attempt to execute the API usage is performed at a proxy layer.

7. The computer-implemented method of claim 6 wherein the proxy layer is functionally positioned to intercept the error message before being received by a cloud API interface.

8. A system comprising:
    one or more processors; and
    a non-transitory computer-readable medium or media comprising one or more sets of instructions that, when executed by at least one of the one or more processors, causes implementation comprising:
        a proxy component that intercepts an error message related to an API usage that includes an error that results in the error message being generated following an attempt to execute the API usage, passes the error message to a recommendation engine, and that sends a supplemented error message comprising a set of API recommendations to a user; and
        the recommendation engine that received the error message and that:
            responsive to the error message for the API usage identifying a field within the API usage that contains the error, performing at least one of:
                using the identified field in the error message to search an API datastore for possible API matches as potential recommendations; and
                using at least one or more non-identified fields in the error message to search the API datastore for possible API matches as potential recommendations; and
            responsive to the error message for the API usage not identifying a field within the API usage that contains the error, using one or more fields of the API usage to search the API datastore for possible API matches as potential recommendations; and
        wherein the proxy component or the recommendation engine supplements the error message with the set of API recommendations from the potential recommendations.

9. The system of claim 8 wherein selecting the set of API recommendations includes considering frequency of usage of an API.

10. The system of claim 8 wherein the step of searching an API datastore for possible API matches as potential recommendations comprising:
    using text matching to match at least a portion of the API usage with the error to one or more other API usages or APIs;
    using a representation of at least a portion of the API usage and one or more similarity methods to identify one or more API usages or APIs that are the same or similar as the API usage with the error; or both.

11. The system of claim 10 wherein the step using a representation of at least a portion of the API usage and one or more similarity methods to identify one or more API usages or APIs that are the same or similar as the API usage with the error comprises:
converting at least a portion of the API usage into one or more representations; and
using a similarity comparison to compare one or more of the representations of the API usage with representations corresponding to valid APIs stored in the datastore.

12. The system of claim 8 wherein the set of API recommendations comprises the possible API matches that exceed a threshold level of similarity, that are a top set of matches, or both.

13. The system of claim 10 wherein the step of using a representation of at least a portion of the API usage and one or more similarity methods to identify one or more API usages or APIs that are the same or similar as the API usage with the error comprises:
converting at least a portion of the API usage into the representation; and
inputting the representation into a trained neural model that using the representation as an input and outputs a set of similar APIs.

14. A non-transitory computer-readable medium or media comprising one or more sequences of instructions which, when executed by at least one processor, causes steps to be performed comprising:
intercepting an error message related to an API usage that includes an error that results in the error message being generated following an attempt to execute the API usage;
responsive to the error message for the API usage identifying a field within the API usage that contains the error, performing at least one of:
using the identified field in the error message to search an API datastore for possible API matches as potential recommendations; and
using at least one or more non-identified fields in the error message to search the API datastore for possible API matches as potential recommendations;
responsive to the error message for the API usage not identifying a field within the API usage that contains the error, using one or more fields of the API usage to search the API datastore for possible API matches as potential recommendations;
supplementing the error message with a set of API recommendations from the potential recommendations; and
sending the supplemented error message comprising the set of API recommendations for displaying to a user.

15. The non-transitory computer-readable medium or media of claim 14 wherein the set of API recommendations comprises an indicator that there are no API recommendations.

16. The non-transitory computer-readable medium or media of claim 14 wherein the step of searching an API datastore for possible API matches as potential recommendations comprising:
using text matching to match at least a portion of the API usage with the error to one or more other API usages or APIs;
using a representation of at least a portion of the API usage and one or more similarity methods to identify one or more API usages or APIs that are the same or similar as the API usage with the error; or both.

17. The non-transitory computer-readable medium or media of claim 16 wherein the step using a representation of at least a portion of the API usage and one or more similarity methods to identify one or more API usages or APIs that are the same or similar as the API usage with the error comprises:
converting at least a portion of the API usage into one or more representations; and
using a similarity comparison to compare one or more of the representations of the API usage with representations corresponding to valid APIs stored in the datastore.

18. The non-transitory computer-readable medium or media of claim 14 wherein the set of API recommendations comprises the possible API matches that exceed a threshold level of similarity, that are a top set of matches, or both.

19. The non-transitory computer-readable medium or media of claim 14 wherein the step of intercepting an error message related to the API usage that includes an error that results in the error message being generated following an attempt to execute the API usage is performed at a proxy layer.

20. The non-transitory computer-readable medium or media of claim 19 wherein the proxy layer is functionally positioned to intercept the error message before being received by a cloud API interface.

* * * * *